(12) United States Patent
Cande et al.

(10) Patent No.: US 9,727,470 B1
(45) Date of Patent: Aug. 8, 2017

(54) USING A LOCAL CACHE TO STORE, ACCESS AND MODIFY FILES TIERED TO CLOUD STORAGE

(71) Applicant: EMC Corporation, Hopkinton, MA (US)

(72) Inventors: Edward G. Cande, Bedford, NH (US); Lijun Wang, Westborough, MA (US); Jonathan M. Walton, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 14/501,928

(22) Filed: Sep. 30, 2014

(51) Int. Cl.
*G06F 12/08* (2016.01)
*G06F 17/30* (2006.01)
*G06F 12/084* (2016.01)
*G06F 12/0831* (2016.01)

(52) U.S. Cl.
CPC ........ *G06F 12/084* (2013.01); *G06F 12/0833* (2013.01); *G06F 17/30165* (2013.01); *G06F 17/30171* (2013.01); *G06F 17/30359* (2013.01); *G06F 17/30362* (2013.01); *G06F 2212/2515* (2013.01); *G06F 2212/621* (2013.01)

(58) Field of Classification Search
CPC ............. G06F 12/084; G06F 2212/621; G06F 17/30171; G06F 17/30165; G06F 17/30362; G06F 17/30359
See application file for complete search history.

(56) References Cited

U.S. PATENT DOCUMENTS

| | | | | |
|---|---|---|---|---|
| 8,204,871 B1* | 6/2012 | Pawar | ............... | G06F 17/30132 707/639 |
| 2004/0117580 A1* | 6/2004 | Wu | ..................... | G06F 11/2097 711/170 |
| 2010/0268743 A1* | 10/2010 | Hallyal | ............. | G06F 17/30961 707/797 |
| 2012/0089569 A1* | 4/2012 | Mason, Jr. | .......... | G06F 17/3023 707/639 |
| 2015/0356110 A1* | 12/2015 | Lin | .................... | G06F 17/30171 707/704 |

* cited by examiner

*Primary Examiner* — Ann J Lo
*Assistant Examiner* — Michelle Taeuber
(74) *Attorney, Agent, or Firm* — Krishnendu Gupta

(57) ABSTRACT

Systems and methods are provided herein for efficient local caching of data tiered to cloud storage to help reduce the bandwidth cost of repeated reads and writes to the same region of a stubbed file, increase the performance of write operations, and increase performance of read operations to portions of a stubbed file accessed repeatedly. When operations are directed toward data tiered to the cloud, the data can be read from cloud storage and stored within a local cache. A cache tracking tree can be generated and used to track file regions of a stub file, cached states associated with regions of the stub file, a set of cache flags, and other file and mapping data. For example, the cache state of regions of a stub file can be tracked including a cached data state, a non-cached state, a modified state, or a truncated state. Operations directed toward stubbed files can then look to the cache tracking tree to determine the most efficient way to access, retrieve, or operate on the data that maximizes local file system performance while reducing network activity.

9 Claims, 14 Drawing Sheets

USING A LOCAL CACHE TO STORE, ACCESS AND MODIFY FILES TIERED TO CLOUD STORAGE

CROSS REFERENCE TO RELATED APPLICATIONS

This application is related to co-pending U.S. patent application Ser. No. 14/501,881 for DATA AND METADATA STRUCTURES FOR USE IN TIERING DATA TO CLOUD STORAGE and filed concurrently herewith, which is incorporated herein by reference for all purposes, and to co-pending U.S. patent application Ser. No. 14/501,700 for TIERING DATA TO A CLOUD STORAGE SYSTEM USING PAGE BLOBS and filed concurrently herewith, which is incorporated herein by reference for all purposes, and to copending U.S. patent application Ser. No. 14/501,806 for GARBAGE COLLECTION OF DATA TIERED TO CLOUD STORAGE and filed concurrently herewith, which is incorporated herein by reference for all purposes, and to co-pending U.S. patent application Ser. No. 15/501,958 for TIERING DATA TO CLOUD STORAGE USING CLOUD-POOLS AND POLICIES and filed concurrently herewith, which is incorporated herein by reference for all purposes, and to copending U.S. patent application Ser. No. 14/501,756 for WRITING BACK DATA TO FILES TIERED IN CLOUD STORAGE and filed concurrently herewith, which is incorporated herein by reference for all purposes.

FIELD OF THE INVENTION

This invention relates generally to storing data, and more particularly to systems and methods relating to tiering data from private data storage infrastructure to a public cloud provider.

BACKGROUND OF THE INVENTION

With the advent of cloud storage and the associated proliferation of cloud storage providers, organizations and individuals alike with data storage needs both large and small have begun to assess the feasibility of utilizing cloud storage. For example, an organization that maintains a privately owned data center that hosts data of the organization may wish to tier data to the cloud depending on issues such as price, ease of access, data security, etc. While cloud storage can provide benefits to organizations with varied data storage needs, some organizations may not want to compromise on issues like, for example, data security, by moving their entire set of data to a cloud storage provider.

One way an organization could potentially reduce their private data storage costs may be to tier some of their data to a public cloud while still maintaining a set of data in their private data center. In deciding to tier some data to the cloud, it may be advantageous to still have a inventory and accounting of all data tiered to the cloud within the private data center, while providing easy means to restore tiered cloud data to the private data center upon demand. For example, if your private data center storage interface was unaware of the data the organization is also storing in a public cloud, an information technology professional or end user may have to search for and/or use the data utilizing at least two separate and distinct interfaces. Thus, there exists a need to manage data both stored in a private data center and data tiered from the private data center to a public cloud from a single interface.

In addition to managing both privately hosted data and public cloud data from a common interface, a public cloud data tiering solution may also need to reduce external dependencies on the public cloud storage provider, by creating and utilizing data structures necessary to pass data to and from the cloud storage provider based on the needs of the data storage client. For example, data must be able to be both readable and writable from and to the public cloud. In another example, data storage services such as snapshots and backup must remain compatible with data tiered to the cloud. It can be appreciated that a litany of issues must be addressed to eliminate performance bottlenecks and create a scalable and efficient solution for data storage customers.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a cache tracking tree can be generated based on a stub file, wherein the cache tracking tree tracks file regions of the stub file, cached states associated with regions of the stub file, a set of cache flags, a version, a file size, a region size, a data offset, a last region, and a range map. The cache tracking tree can be associated with the stub file.

In accordance with an aspect, a fill request associated with a set of regions of the stub file can be received. An exclusive cache tracking tree lock can be activated on the cache tracking tree wherein the set of cache flags are set to indicate the activating. A cached state associated with the set of regions of the stub file can be determined. In response to determining the cached state associated with the set of regions of the stub file are not dirty, the exclusive cache tracking tree lock can be downgraded to a shared cache tracking tree lock, wherein the set of cache flags are set to indicate the downgrading. The cached states associated with the set of regions can be updated to cached. A shared region lock can be activated for the set of regions wherein the set of cache flags are set to indicate the shared region lock. File data can be read from cloud storage associated with the set of regions. The file data can be stored in local cache storage based on the cache tracking tree. The shared cache tracking tree lock and the exclusive region lock can be deactivated.

In accordance with an aspect, a read request associated with a set of regions of the stub file can be received. A shared cache tracking tree lock can be activated on the cache tracking tree wherein the set of cache flags are set to indicate the shared cache tracking tree lock. A shared region lock for the set of regions can be activated wherein the set of cache flags are set to indicate the shared lock. A cached state associated with the set of regions of the stub file can be determined. In response to determining the cached state associated with the set of regions of the stub file are not "not cached," the shared region lock can be upgraded to an exclusive region lock. File data can be read from the set of regions. The shared cache tracking tree lock and at least one of the shared region lock or the exclusive region lock can be deactivate.

In accordance with an aspect, a write operation associated with a set of regions of the stub file and a set of write data can be received. An exclusive lock on the cache tracking tree can be activated wherein the set of cache flags are set to indicate the exclusive lock. In response to determining that the file size of the write is greater than the file size, at least one of the file size, the last region, and the range map can be updated. The exclusive lock can be downgraded to a cache tracking tree shared lock, wherein the set of cache flags are set to indicate the cache tracking tree shared lock. An exclusive region lock for the set of regions can be activated wherein the set of cache flags are set to indicate the exclusive region lock. In response to determining that regions of the set of regions are "not cached," regions of the set of regions can be filled. The cached states of the set of regions can be updated to dirty. The write data can be written into the set of regions. The cache tracking tree shared lock and the exclusive region lock can be deactivated.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
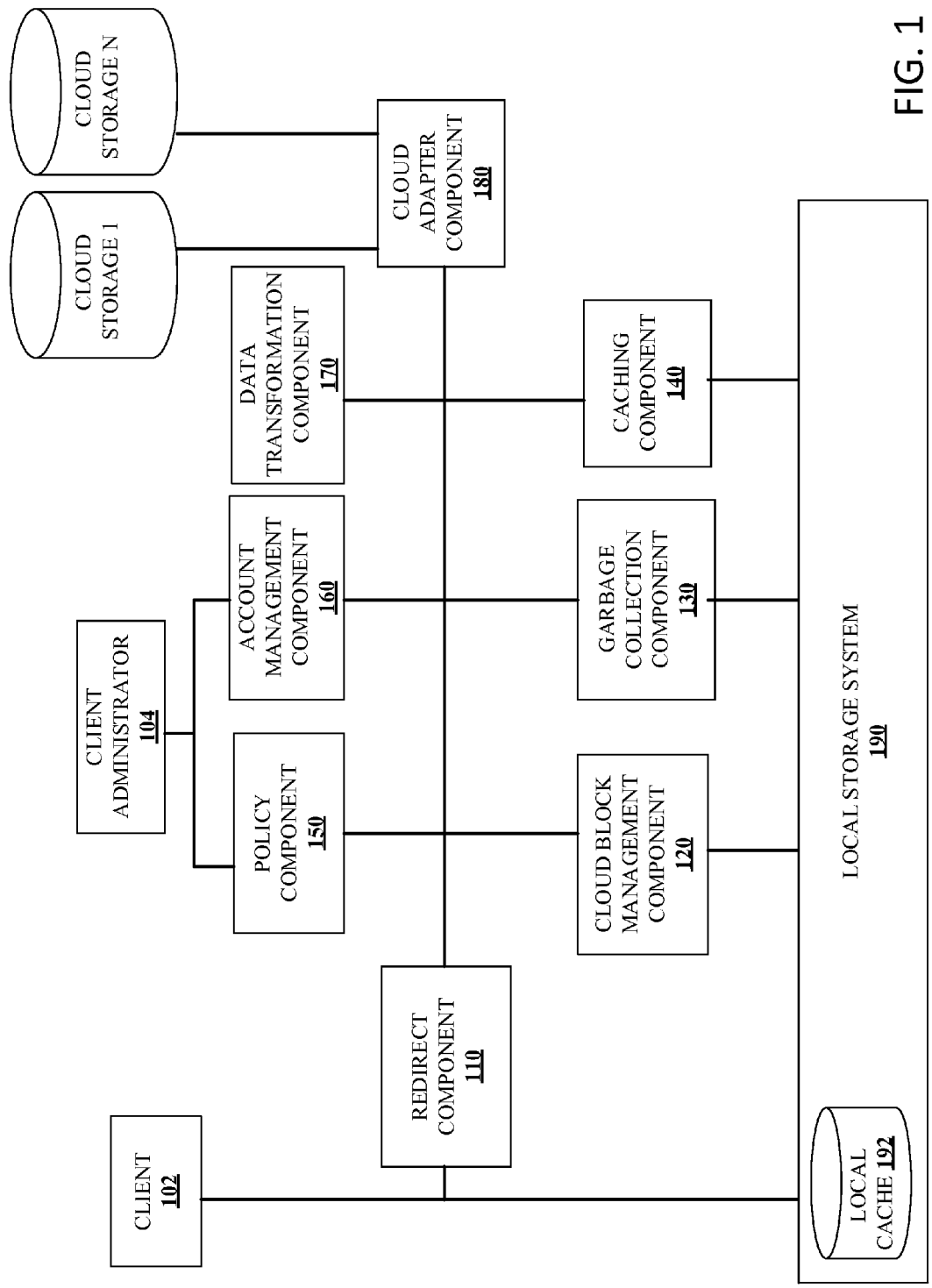
FIG. 1 illustrates an example local storage system including cloud tiering components and a cloud storage location in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "cloudpool" as used herein refers to a pool of cloud storage accounts in which data can be tiered to from private storage infrastructure. It can also refer to a cloud storage provider instance, for example, a Microsoft Azure storage subscription, and Amazon S3 account, or an EMC Isilon RAN namespace access point. A single cloudpool can contain accounts from multiple cloud providers and/or multiple accounts from a single cloud provider.

The terms "primary storage" or "local storage" or "private storage" refer to a data storage system that is the primary access point for stored data. In most implementations, primary storage is private infrastructure operated on the premises of the data storage customer. In one implementation, the primary storage can be an EMC Isilon Cluster.

The term "stub" or "stub file" as used herein refers to the remnant of a file in local storage after its data content is moved to cloud storage. The stub can contain original system metadata, user metadata, additional metadata necessary to manage the stub file and associated data objects, mapping information which provides a location of the cloud data objects which contain the original file content. In some implementations, the stub can contain locally cached data obtained from the cloud. It can be appreciated that until all the content of the file is fully reconstituted from cloud storage, the file can remain a stub. The stub file can contain information about the tiered data's compression state and/or encryption state. In one implementation, the stub file can contain mappings to one cloud object containing the metadata (e.g., Cloud Metadata Object as defined below), The term "local file" as used herein refers to a regular non-stubbed file.

The term "local data cache" or "local cache" or "locally cached data" refers to data obtained from cloud storage and stored in local storage that is associated with a stubbed file. A local data cache can be a specific area of storage space within a clustered file system and does not refer to a specific type of storage device such as solid state storage, flash storage or magnetic storage.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, snapshot information, hash values associated with location of the file, a flag indicating the LIN is associated with a stub file, mappings to cloud data objects, pointers to a cloud metadata objects, etc. In one implementation, LINs may be in a known location in a file system, for example, residing in cache memory for fast and/or efficient access by the file system. Before or in conjunction with performing a file system operation on a file or directory, a system call may access the contents of the LIN and/or the contents of the file in determining how to process the system call. For example, the LIN can be examined to determine if a flag within the LIN indicates the LIN is a stubbed file. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

The term "Cloud Metadata Object" or "CMO" refers to the cloud object containing metadata information relating to tiered data. The CMO can contain reverse links to the original file in local storage, the same mapping information that is stored in the stub file, pertinent policy information related to the file such as retention period, encryption information, compression information, and original file system metadata information. In one implementation, the CMO can also itself be encrypted and/or compressed. One example CMO data structure includes an encrypted file path, a compression flag, the local storage LIN of the stub, the local file path, statistical information on the file, a checksum, mapping information (e.g., includes cloud storage account, object identifier, snapshot identifier, index number, length/size of the object, etc.).

The term "Cloud Data Object" or "CDO" refers to the cloud object containing the actual tiered content data. A cloud data object is generally limited to a chunk size as described below. Depending on the size of the file being tiered to the cloud, and the size of the chunk, in many examples, there can be multiple CDOs representing an individual file. CDOs can be associated with a unique object identifier, a cloud account identifier, and can be associated with sub chunks.

The term "garbage collection" as used herein refers to the action of removing cloud objects no longer referenced by local files, e.g., stub files. In some implementations, the action of garbage collection does not occur until retention periods have expired.

Referring now to FIG. 1, there is illustrated an example local storage system including cloud tiering components and a cloud storage location in accordance with implementations of this disclosure. Client 102 can access local storage system 190. Local storage system 190 can be a node and cluster storage system such as an EMC Isilon Cluster that operates under OneFS operating system. Local storage 190 can also store the local cache 192 for access by other components. It can be appreciated that the systems and methods described herein can run in tandem with other local storage systems as well.

As more fully described below with respect to redirect component 110, redirect component 110 can intercept operations directed to stubbed files. Cloud block management component 120, garbage collection component 130, and caching component 140 may also be in communication with local storage system 190 directly as depicted in FIG. 1 or through redirect component 110. A client administrator 104 may use an interface to access the policy component 150 and the account management component 160 for operations as more fully described below with respect to these components. Data transformation component 170 can operate to provide encryption and compression to files tiered to cloud storage. Cloud adapter component 180 can be in communication with Cloud Storage 1 and Cloud Storage N, where N is a positive integer. It can be appreciated that multiple cloud storage locations can be used for storage including multiple accounts within a single cloud storage location as more fully described in implementations of this disclosure.

Cloud block management component 120 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range) and a set of cloud objects where individual cloud objects can be defined by at least an account, a container, and an object identifier. The mapping information can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files which are modified in different regions of the file.

File content can be mapped by the cloud block management component 120 in chunks of data. A uniform chunk size can be selected where all files that tiered to cloud storage can be broken down into chunks and stored as individual cloud objects per chunk. It can be appreciated that a large chunk size can reduce the amount of objects needed to represent a file in cloud storage; however, a large chunk size can decrease the performance of random writes. For example, if a chunk size of 100 MB is chosen, and an application is writing 8 KB of data somewhere within the chunk, the cloud block management component 120 could need to fetch a 100 MB object from the cloud first in order to overwrite the whole object chunk. It can also be appreciated that the chunk size cannot be too small as the smaller the chunk size, the more chunks will need to be passed between local storage and cloud storage possibly creating additional performance costs and network bandwidth costs. In one implementation, a chunk size of 1 MB is used. In some implementations, chunks can be broken up into sub chunks as separate objects. For example, in an implementation with a chunk size of 1 MB, sub chunks of 128 KB can be used to form 8 sub chunks for each chunk.

The Account management component 160 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 120 based on list of mappings it manages. For example, each stub can be associated with an account, and the cloud block management component 120 can aggregate information from a set of stubs associated with the same account. Other example statistics that can be maintained include the number of recalls, the number of writes, the number of modifications, the largest recall by read and write operations, etc.

In one implementation, the account management component 160 can periodically synchronize information with the cloud storage provider, for example, the amount of free capacity remaining on the account. It can be appreciated that periodic synchronization may correct any differences between the inventory kept by the cloud block management component 120 and the cloud provider.

In one implementation, multiple accounts can exist for a single cloud service provider, each with unique account names and access codes.

The Cloud adapter component 180 manages the sending and receiving of data to and from the cloud service providers. The Cloud adapter component 180 can utilize a set of Application Programming Interfaces ("API"). For example, each cloud service provider may have provider specific API to interact with the provider. In one implementation two different sets of APIs can be utilized. One set of APIs can be data access APIs that can assist in pass-through input output with the cloud provider, data recall from the cloud provider, and file stubbing. A second set of APIs can be configuration APIs that assist in synchronizing configuration data, primarily the free space available on the account and the account access key.

In one implementation, cloud adapter component 180 can relay a "not found" error message to the local file system when an IO request is received for a cloud data object that the cloud adapter cannot find in the location where the data object should be. It can be appreciated that the "not found" message can indicate a lack of data consistency for the object, and data still residing in local cache can be used to reestablish consistency with cloud storage.

A policy component 150 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 130. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

The policy component 150 can also identify files that satisfy the policies by scanning local storage. It can be appreciated that repeatedly scanning the entirety of local storage can provide performance penalties for regular users of local storage due to the computing resources used in the scanning. Thus, in one implementation, the policy component 150 can schedule the scanning to occur at specific times, over specific time intervals, or in limited parts of the local storage system. In one implementation, the scanning can occur asynchronously over time, where once files are identified for tiering by the policy component 150, they can be tiered to cloud storage prior to, later than, and/or contemporaneously with ongoing scanning. In one implementation, policies provide the ability to do either namespace based scanning or LIN tree based scanning.

The policy component 150 can also establish and enforce recall policies. For example, policy driven automatic recall can recall the entire content of a stubbed file from the cloud and turn it back into a local file. Recall policies can be established using, for example, the percentage of the file that is locally cached data, the total access times (read/write) over a custom time period, etc. Thus, similar to the scanning relating to identifying files for tiering, scanning can occur in a similar manner for determining files to recall. In one implementation, recall scanning and recall activities can occur asynchronously over time, where once files are identified for recall by the policy component 150, they can be recalled to local storage prior to, later than, and/or contemporaneously with ongoing scanning. In one implementation, recall policies provide the ability to do either namespace based scanning or LIN tree based scanning.

A garbage collection component 130 can be used to determine which files/objects/data constructs remaining in both local storage and cloud storage can be deleted. In one implementation, the resources to be managed for garbage collection include CMOs, CDOs, local cache data, and cache state information. For example, when a file is recalled back to local storage, the objects (e.g., CMO and CDO) corresponding to the file will remain in cloud storage after the recall operation is performed. It can be appreciated that it may be advantageous for data integrity and as a failsafe to retain the cloud objects in cloud storage relating to a recalled file for a certain period of time prior to permanently deleting the object. It can also be appreciated that retaining cloud objects for previously recalled files in perpetuity may lead to unnecessary storage costs to a user who may be paying the cloud storage provider based on the amount of data stored.

Generally, for normal file system operations, a user choosing to delete a file does not necessarily mean the data of the file can be removed permanently from local storage. For example, if a snapshot (e.g., the state of a file at a particular point in time) is still referencing the now deleted file, the file should be maintained in local storage until the all snapshots referencing the deleted version of the file are inactive. In another example, deduplicated files may share commonality with other files that are saved as a single instance in local storage to conserve storage space. Thus, even if a user desires to delete a file, if another file shares commonality with the deleted file, the file should be maintained in local storage until all deduplicated files that share the same commonality are deleted.

A redirect component can be used to redirect all input and output requests associated with cloud storage activities to user space from the kernel. For example, normal read requests would generally occur within the kernel. However, in one example, a read request associated with a stubbed file can be redirected to the components described herein to operate on the request. Types of operations that can be redirected by the redirector component include creating a stub file, reading a stubbed file, writing to a stubbed file, updating file links to stubbed files, creating/deleting/modifying cloud objects, garbage collection, etc.

A caching component 140 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 120, files that are tiered are split into chunks and in some implementations, sub chunks. Thus, a stub file or a secondary data structure can be maintained to store states of each chunk or sub-chunk of a stubbed file. States can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file, and can allow, in one example, reads to be directly served locally without looking to the cache tracking tree.

The caching component 140 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining 5 operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 140 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state.

In another example, before a write operation, an entry is placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 170 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate $3^{rd}$ party. In one implementation, data can be encrypted locally before storing/writing the data to cloud storage.

In one implementation, an external key management system can be used where each stub and its associated cloud objects retain an initialization vector to retrieve a key from a secure key management system. For example, RSA Key Manager could be used as the external key management system. In one implementation, a pool of current keys can be used which are associated with an expiration date for encrypting new data. In one implementation, there can be a limit placed on the number of files that share the same key. In one implementation, key selection from the pool can be random. In one implementation, a limit can be established for the number of new keys consumption rate. An example process for encryption at the time data is written to cloud storage can include: (1) getting a new key and a key identifier; (2) using the key to encrypt the data; (3) storing the key identifier and an encrypted data encryption key to the stub; and (4) storing the key identifier in the associated CMO and/or CDO. An example process for decryption at the time data is recalled from cloud storage can include: (1) verify the key identifier; (2) get the key using the key identifier and decrypt the data encryption key; and (3) decrypt the data using the key. In one implementation AES 256 is used as the encryption algorithm.

In one implementation, a key can be generated for each stub and the generated key can be used to encrypt the data. The data key can be encrypted with a master encryption key ("MEK"). The data encryption key can be stored within the cloud object. At the time of decryption, the MEK can be used to decrypt the data encryption key and the data encryption key can be used to decrypt the data.

In implementations involving compression, data can be compressed before being stored in cloud storage. It can be appreciated that by compressing data prior to storage in cloud storage, cloud storage costs and transfer costs may be reduced. In one implementation, compression can occur at the chunk and/or sub-chunk level. It can be appreciated that by compressing objects at the chunk level, partial retrievals of a file (e.g., retrieval of less than all the chunks that make up the file) can be possible as each chunk can be decompressed independently of other chunks.

FIGS. 2-13 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

It can be appreciated the steps as illustrated in FIGS. 2-13 can be accomplished through distributed processing where steps are performed by any number of threads on different nodes a distributed computing cluster. For example, one node in a cluster can perform at least one thread either synchronously or asynchronously with another node in the cluster performing at least one thread.

Figure 2:
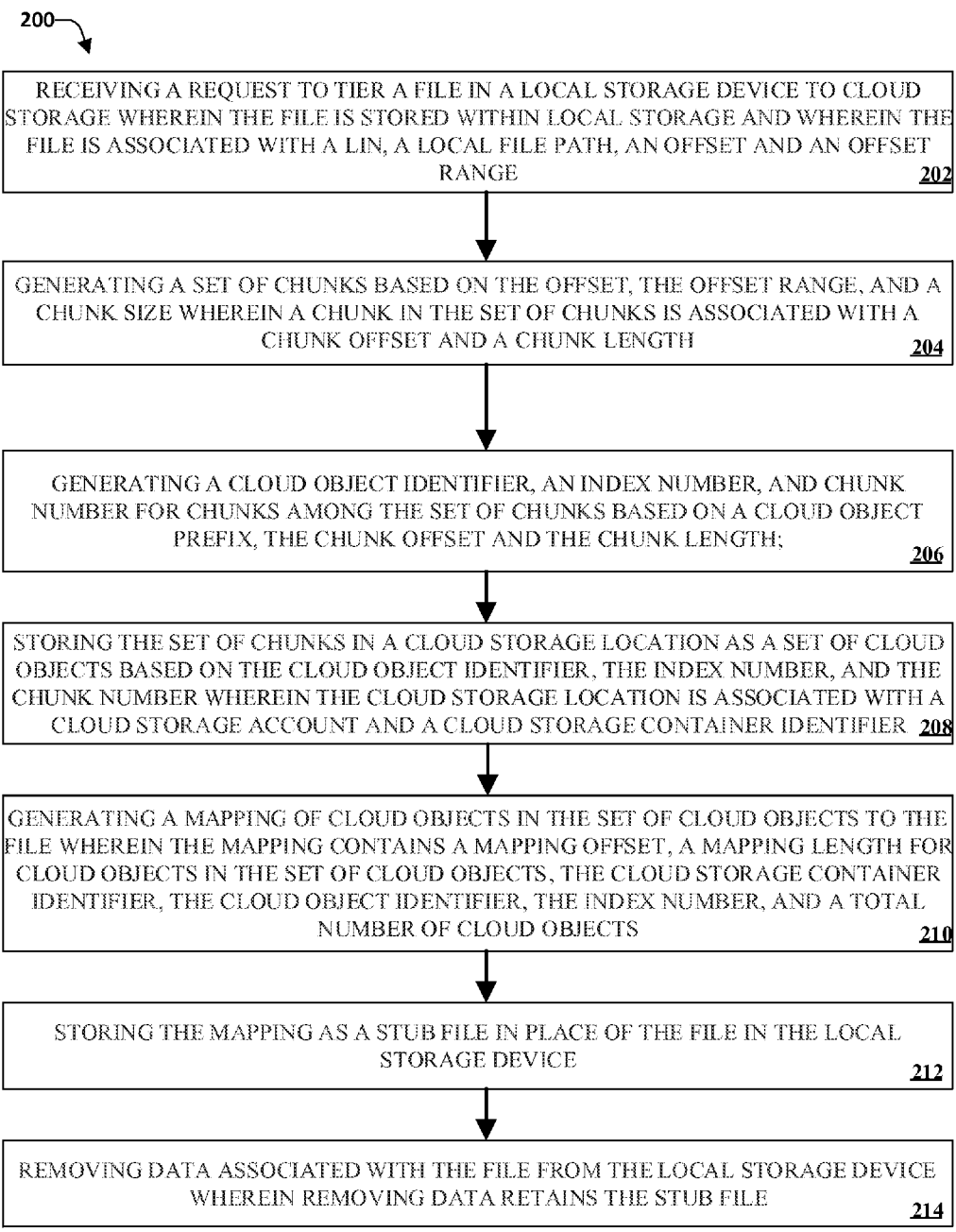
FIG. 2 illustrates an example flow diagram method for tiering data to the cloud from local storage in accordance with implementations of this disclosure.

FIG. 2 illustrates an example flow diagram method for tiering data to the cloud from local storage in accordance with implementations of this disclosure.

At 202, a request to tier a file in a local storage device to cloud storage can be received wherein the file is stored within local storage and wherein the file is associated with a LIN, a local file path, an offset and an offset range. It can be appreciated that the request can be a manual request from a user or an automated request generated via policy. The local file path can retain where in the file system hierarchy the file is located, for example, noting a parent LIN. The offset and the offset range can denote a specific location in the local storage device where the file data is stored. For example, the offset can be the beginning block offset of the file data, and the range can be a length in blocks of the file data. In another example, the file data can be spread among multiple storage devices in the same node or among multiple nodes in a cluster. Thus, file data can include multiple offsets and offset ranges for portions of data stored on various storage devices among the storage system cluster.

At 204, a set of chunks can be generated based on the offset, the offset range, and a chunk size wherein a chunk in the set of chunks is associated with a chunk offset and a chunk length. It can be appreciated that a uniform chunk length can be chosen so that the majority of chunks can maintain the same length. In one implementation, the chunk length is 1 MB. For example, a 7.5 MB file could be split into seven 1 MB chunks and an eighth chunk that is 0.5 MB. Thus each chunk can be specified a length, and the chunk offset can specify where on disk or in cache the chunk begins. It can be appreciated that by knowing the offset and offset range of the file, the size of a file can be determined and an amount of chunks can be generated based on the amount of data and the chunk length.

At 206, a cloud object identifier, an index number, and chunk number for chunks among the set of chunks can be generated based on a cloud object prefix, the chunk offset and the chunk length. In one implementation, the cloud object prefix is based on applying a hashing algorithm to the LIN associated with the file. In one implementation, the cloud object identifier is generated by using the cloud object prefix along with the chunk number as a suffix. Thus, all chunks for a single file will share the same prefix within their object identifier. In one implementation, all chunks for a single file will share the same index number. It can be appreciated that as new versions of the file are written to cloud (See FIGS. 4-5 for more detail), the index number can change to reflect a new version of the file.

At 208, the set of chunks can be stored in a cloud storage location as a set of cloud objects based on the cloud object identifier, the index number, and the chunk number wherein the cloud storage location is associated with a cloud storage account and a cloud storage container identifier. In some implementations, the cloud objects can be encrypted and/or compressed prior to being stored in the cloud storage location.

At 210, a mapping of cloud objects in the set of cloud objects to the file can be generated wherein the mapping contains a mapping offset, a mapping length for each cloud object in the set of cloud objects, the cloud storage container identifier, the cloud object identifier, the index number, and a total number of cloud objects. For example, the mapping offset can be the original offset within the original file, thus, the file can begin at an offset of zero. Cloud objects that share the same cloud identifier can be sequenced by chunk number and the length of each chunk so that when a local client requests access to a portion of the file, it can first be determined at what offset in the file the client is requesting, and then a corresponding chunk (e.g., cloud object) can be determined that has the data requested by the client. In one implementation, a mapping entry can include a cloud object id, a cloud storage account, a cloud storage container, a cloud index number, an offset length, and a cloud snapshot identifier for each cloud object. The mapping entry can then be keyed to a file offset and/or offset range to which the mapping entry represents.

At 212, the mapping can be stored as a stub file in place of the local file in the local storage device. It can be appreciated that the LIN and the local path can be determined by the stub file's namespace data itself. In one implementation, the stub file can also include an active stub flag. For example, when the local storage system attempts to access the file after the data has been tiered to the cloud, an active stub flag would alert the local storage system that the content of the file has been tiered to the cloud and redirect the access request to the cloud storage system, using methods as described within this specification. In one implementation, the stub file can also be stored in the cloud storage location. For example, having a copy of the stub file in cloud storage may assist in disaster recovery or backup operations if the stub file in local storage is lost.

At 214, data associated with the file can be removed from the local storage device wherein removing data retains the stub file. It can be appreciated that the stub file remains associated with the LIN of the file that, as discussed above, remains to redirect attempts to access the file to the cloud. The actual data of the file that has been tiered to cloud storage, can be removed from local storage and/or freed for other purposes. It can be appreciated that by maintaining the stub file associated with the LIN of the file, attempts to access the file by a client of the local storage system can remain transparent to the actual data of the file being stored in cloud storage.

Figure 3:
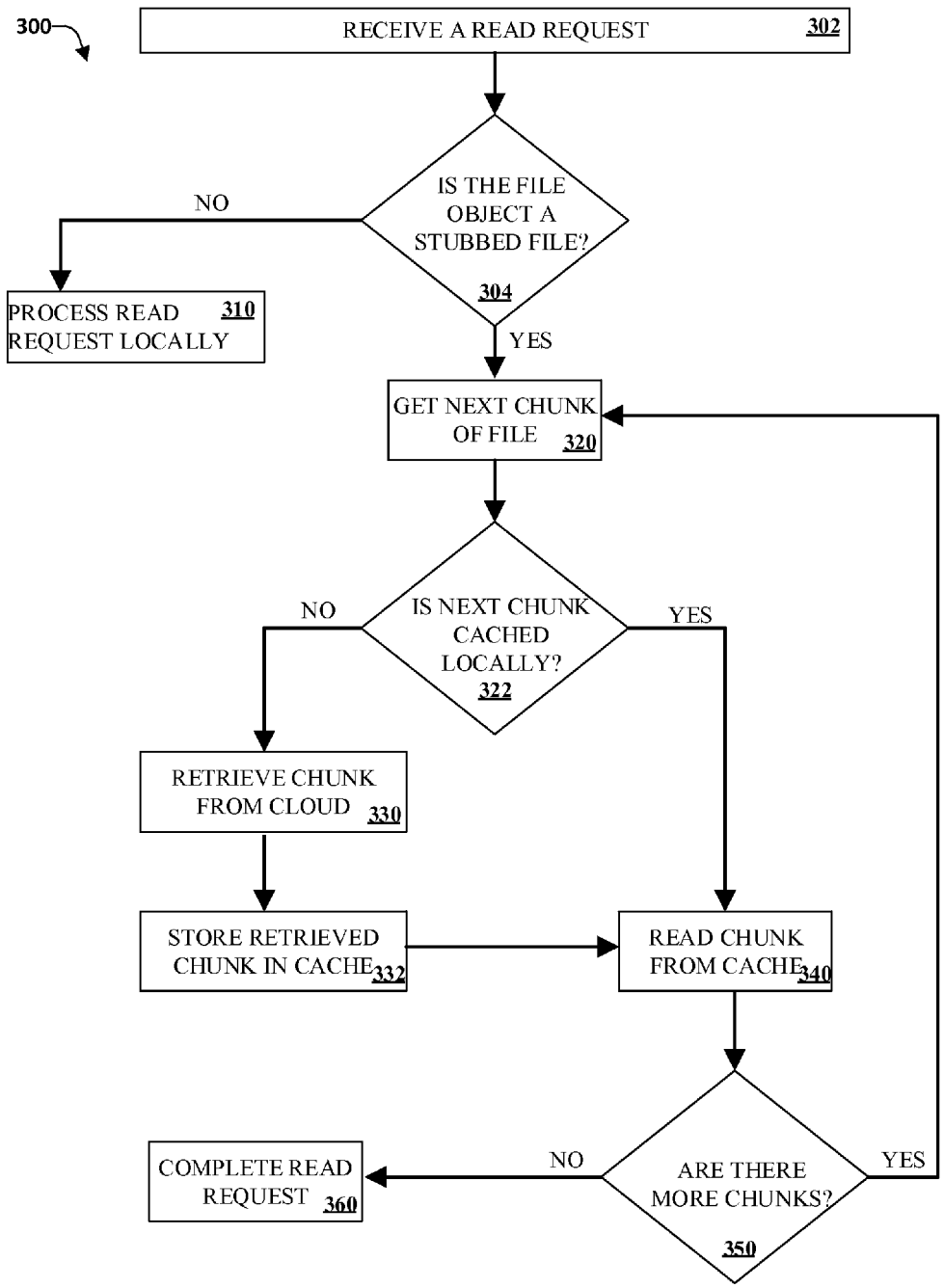
FIG. 3 illustrates an example flow diagram method for performing a read operation on data tiered to cloud storage in accordance with implementations of this disclosure.

FIG. 3 illustrates an example flow diagram method for performing a read operation on data tiered to cloud storage in accordance with implementations of this disclosure. At 302, a read request can be received, from, for example, a client, an automated process, etc. At 304, it can be determined whether the file object or LIN is associated with a stubbed file. For example, a stub file may be signified by an active sub flag associated with the LIN. If the file is not a stub file, at 310, the read request can be processed locally as any non-cloud storage related read request is processed. If at 304 the file is identified as a stub file, an iterative loop can begin at step 320.

At 320, the iterative loop beings where the next chunk of a file is requested. As stated above with respect to FIG. 2, a stub file will be associated with mapping that has mapped chunks of the file to specific objects within cloud storage. However, prior to retrieving chunks from cloud storage, at 322, it can first be determined whether the chunk at issue has already been cached in local cache storage. It can be appreciated that by checking first whether the chunk is already available in local cache storage, unnecessary cloud I/O and network traffic can be minimized. If the chunk is in local cache storage, the chunk can be read from local cache storage at 340. If the chunk is not in local cache storage, at 330, the chunk can be retrieved from cloud storage, using, for example, the mapping information associated with the stub file. In one implementation, retrieving a cloud object from cloud storage can include receiving at least one cloud object checksum with the object. The at least one cloud object checksum can be compared with a checksum associated with the stub file data for that chunk. The contents of the chunk can then be validated by comparison. It can be appreciated that the stub file can be associated with a checksum where the association was made at the time the file was stored in the cloud. Thus, the checksum validation can be used to ensure data integrity for files returning back to local storage from cloud storage. In one implementation, in response to storing the at least one cloud object in the local cache, at least one of decompressing or decrypting the cloud object can occur. Thus, data that was compressed and/or encrypted prior to being stored within cloud storage can be decrypted and/or decompressed after being returned from cloud storage.

At 332, the retrieved chunk can be stored in local cache storage and the method can proceed to step 340 where the chunk is read from local cache storage. In one implementation, the chunk is read from local storage only if permitted by the policy and the file system state. At 350, if there are more chunks to be read, the loop can restart at step 320. If there are not more chunks to be read, the read request can be completed at step 360.

Figure 4:
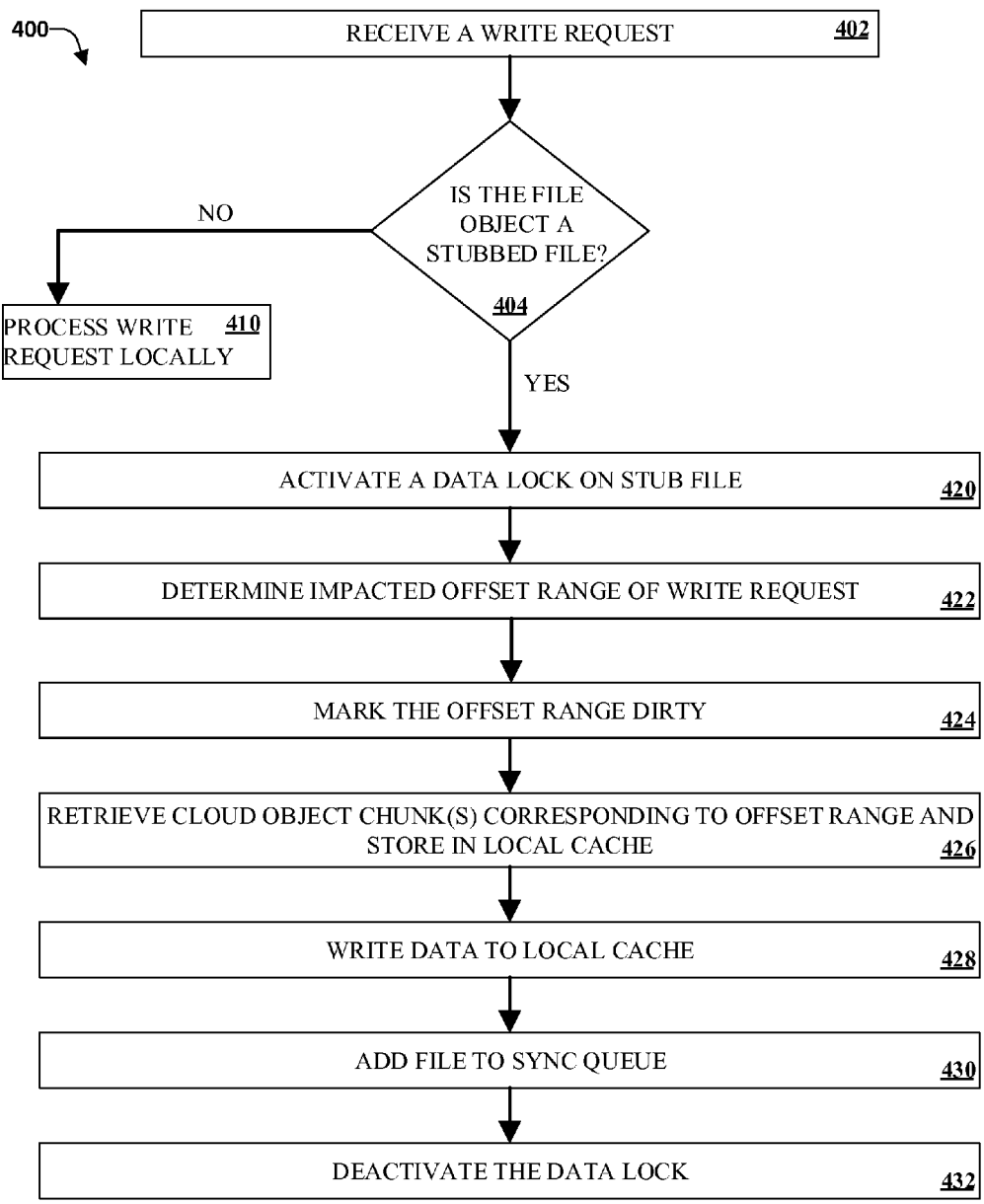
FIG. 4 illustrates an example flow diagram method for performing a write operation on data tiered to cloud storage in accordance with implementations of this disclosure.

FIG. 4 illustrates an example flow diagram method for performing a write operation on data tiered to cloud storage in accordance with implementations of this disclosure. At 402, a write request can be received for a file. At 404, it can be determined whether the write request is for a stubbed file. If the write request is not directed towards a stubbed file, at 410 the method can proceed with processing the write request locally.

If at 404, the file associated with the write request is determined to be a stubbed file, at 420, a data lock can be activated on the stub file. It can be appreciated that by locking the file, it will prevent other file system operations from performing operations on the data while the lock is active. At 422, an impacted offset range can be determined for the write request. For example, some write requests may be only for a small portion of a file, while other write requests may want to overwrite the entirety of the file. At 424, the offset range corresponding to the write request can be marked as dirty. It can be appreciated that by marking the offset range as dirty, later read requests to the same offset range will be aware that the data in cloud storage representing this offset area is not current, preventing a data inconsistency.

At 426, cloud object chunks can be retrieved from cloud storage corresponding to the offset range, and stored in local cache. For example, the write request may cover only portions of individual chunks so it can be desirable to preload the entire chunk in cache prior to writing the data, so that chunk integrity is maintained when storing the updated file data back into cloud storage.

At 428, the data can be written into the local cache. At 430, the updated file can be added to the synch queue. It can be appreciated that by doing asynchronous writes, that is by first updating local cache and then queuing the update in a sync queue to be performed later, serial writes to the same data can operate within the local cache and minimize I/O and network traffic to the cloud storage provider. At 432, the data lock can be deactivated.

Figure 5:
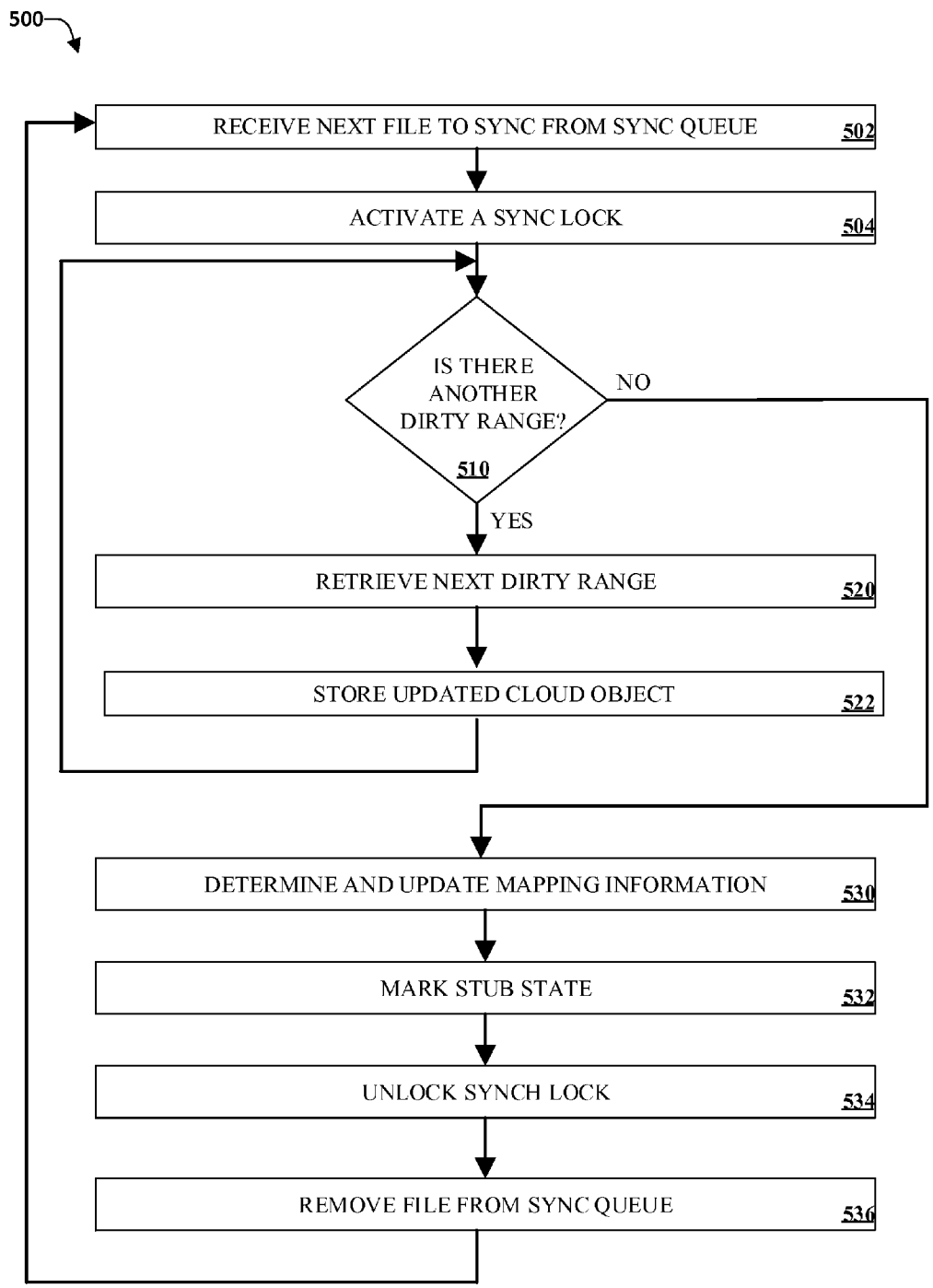
FIG. 5 illustrates an example flow diagram method for synching data between local storage and cloud storage in accordance with implementations of this disclosure.

FIG. 5 illustrates an example flow diagram method for synching data between local storage and cloud storage in accordance with implementations of this disclosure. At 502, the next file to be synched can be received from a synch queue. At 504, a synch lock can be activated that locks the areas of the local cache corresponding to the data to be synched and/or the stub file. At 510, a loop can start for updating all dirty ranges of a file. If there is a dirty range, at 520, the next dirty range can be retrieved from local cache. At 522, the updated cloud object can be stored.

Returning to step 510, if there are no additional dirty ranges to process, at 530, new mapping information can be determined and the mapping information associated with the stub can be updated to incorporate the new mapping information. For example, previous versions of objects may remain in the cloud for backup or snapshot purposes, thus, the new mapping information can reference the unchanged chunks from the previous version as well as updated chunks that are stored as new cloud objects. In another example, it is possible two stubs may reference the same cloud object as a chunk in their respective associated mappings. Thus, if only one of the files is being synched with new data, it is necessary to retain the original data object still being actively mapped by the second file. It can be appreciated that garbage collection processes can function to remove data objects from cloud storage based on myriad of factors including whether a cloud object is still being referenced by any active stubs or active snapshots.

At 532, the stub state can be marked and/or updated as described supra. At 534, the synch lock can be unlocked. At 536, the file can be removed from the synch queue.

In one implementation, a check point can be used when a new round of synchronization is initialized. As the synch process progresses, the check pointing can record the actions taken in cloud storage. For example, creating a CDO, creating a master CDO, taking a snapshot, renaming a CDO, etc. The check pointing can also record the positional information within cloud objects of the sync process. It can be appreciated that the check pointing can be used to, for example when a process fails due to a network or system error, resume a writeback from the last place it was interrupted. In another example, the check point process can identify objects created in the cloud but abandoned after a process failure, e.g., a new object was created when restarting the process. In one implementation, at the beginning of a writeback process, check pointing information can be used to determine whether to resume a previously started writeback or to begin anew.

Figure 6:
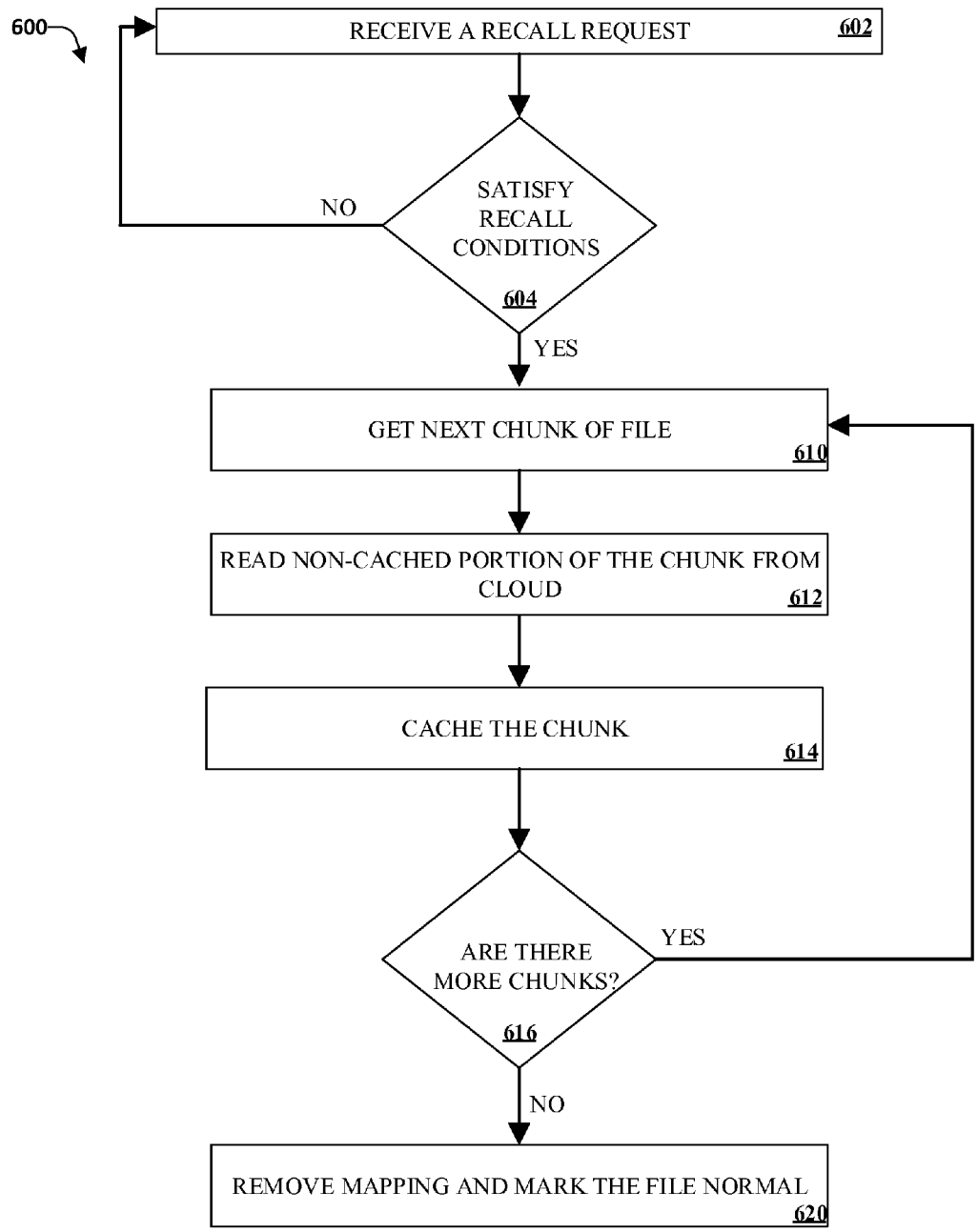
FIG. 6 illustrates an example flow diagram method for recalling data from cloud storage in accordance with implementations of this disclosure.

FIG. 6 illustrates an example flow diagram method for recalling data from cloud storage in accordance with implementations of this disclosure. At 602, a recall request can be received. At 604, it can be determined whether recall conditions have been satisfied. For example, when a certain percentage of the file data has been accessed actively, automatic recall may be effected through policy. In one implementation, recall can be done manually by a user. It can be appreciated that not all users of the storage system may be granted manual recall privileges.

At 610, an iterative loop can begin that retrieves the chunks of the file. At 612, non-cached portions of the chunk can be retrieved from the cloud. At 614, the chunk can be cached. At 616 it can be determined whether there are additional chunks to retrieve and the loop can restart at step 610 if there are. If there are not any more chunks to retrieve, the data can continue to reside in the local cache, the LIN can be updated to reflect the offset locations in local cache where the data is stored, and mapping information and other portions of the stub can be deleted, returning the file to a local file. It can be appreciated that the data need not be moved from local cache to local storage, as the local cache is a part of local storage.

Figure 7:
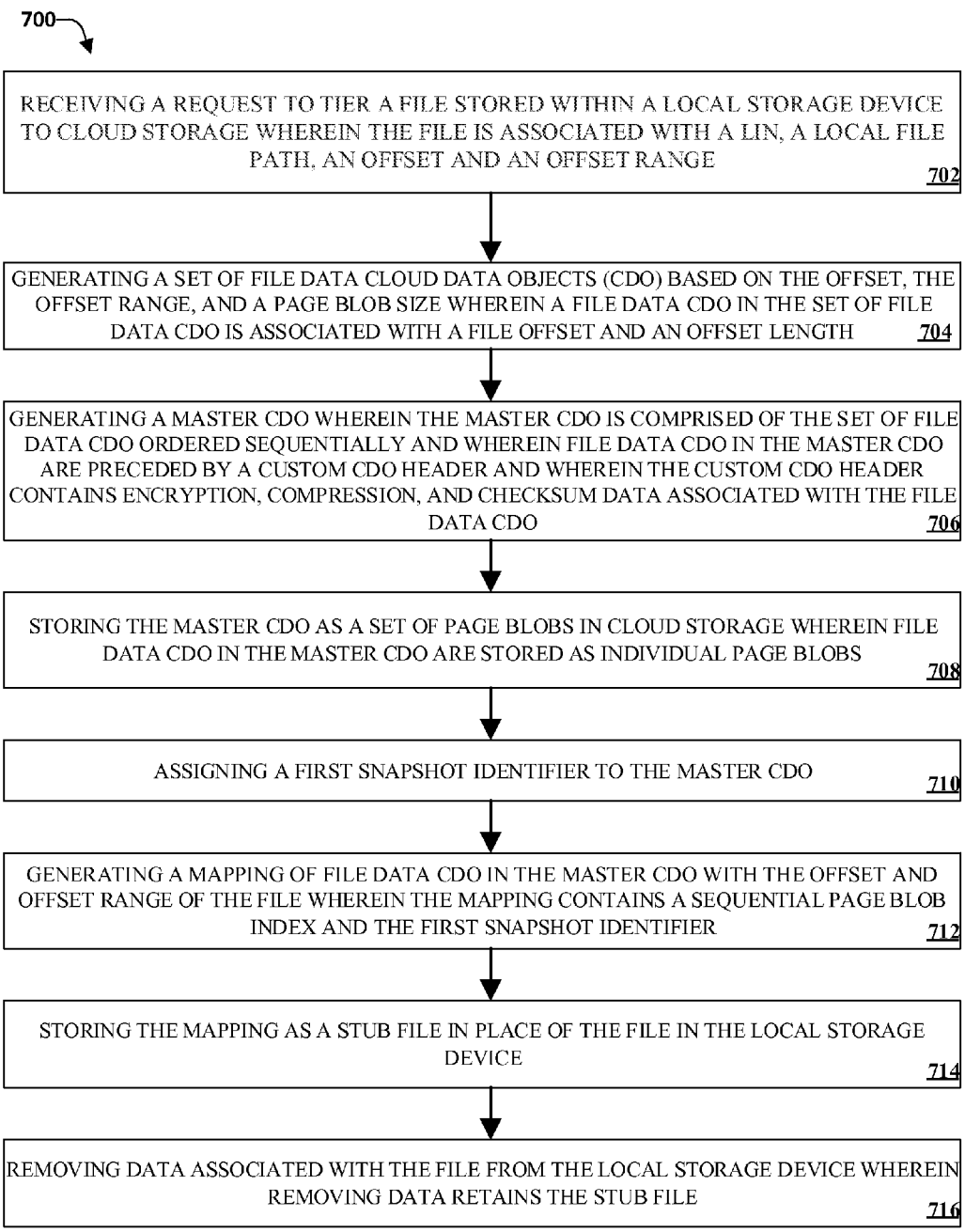
FIG. 7 illustrates an example flow diagram method for tiering data to a cloud service provider using page blobs in accordance with implementations of this disclosure.

FIG. 7 illustrates an example flow diagram method for tiering data to a cloud service provider using page blobs in accordance with implementations of this disclosure. Blob stands for binary large object and is a collection of binary data as a single entity. A page blob is a collection of pages in a blob where a page is a range of data that is identified by its offset from the start of the blob. At 702, a request can be received to tier a file stored within a local storage device to cloud storage wherein the file is associated with a LIN, a local file path, an offset, and an offset range.

At 704, a master CDO can be generated wherein the master CDO is comprised of a set of file data CDO ordered sequentially and wherein file data CDO in the master CDO are preceded by a custom CDO header and wherein the custom CDO header contains encryption, compression, and checksum data associated with the file data CDO. For example, the master CDO can be generated as a page blob, and as stated below with respect to step 706, file data CDO can be generated at specific offsets within the page blob. In one implementation, more than one master CDO can be used for a file and/or data object if the file is bigger than the size of the page blob. At 706, the set of file data CDO can be generated based on the offset, the offset range, and a page blob size wherein a file data CDO in the set of file data CDO is associated with a file offset and an offset length. In one implementation, the page blob's page size is 512 kilobytes.

At 708, the master CDO can be stored as one page blob in cloud storage wherein file data CDO in the master CDO are stored within the master CDO using a set of continuous pages. At 710, a first snapshot identifier can be assigned to the master CDO. It can be appreciated that the snapshot identifier can be a cloud snapshot identifier provided as a service by the cloud provider that can be native to the cloud storage platform.

At 712, a mapping of file data CDO in the master CDO with the offset and offset range of the file can be generated wherein the mapping contains a sequential page blob index and the first snapshot identifier. At 714, the mapping can be stored as a stub file in place of the file in the local storage device. In one implementation, the stub file further contains an active stub flag. At 716, data associated with the file can be removed from the local storage device wherein removing data retains the stub file.

Figure 8:
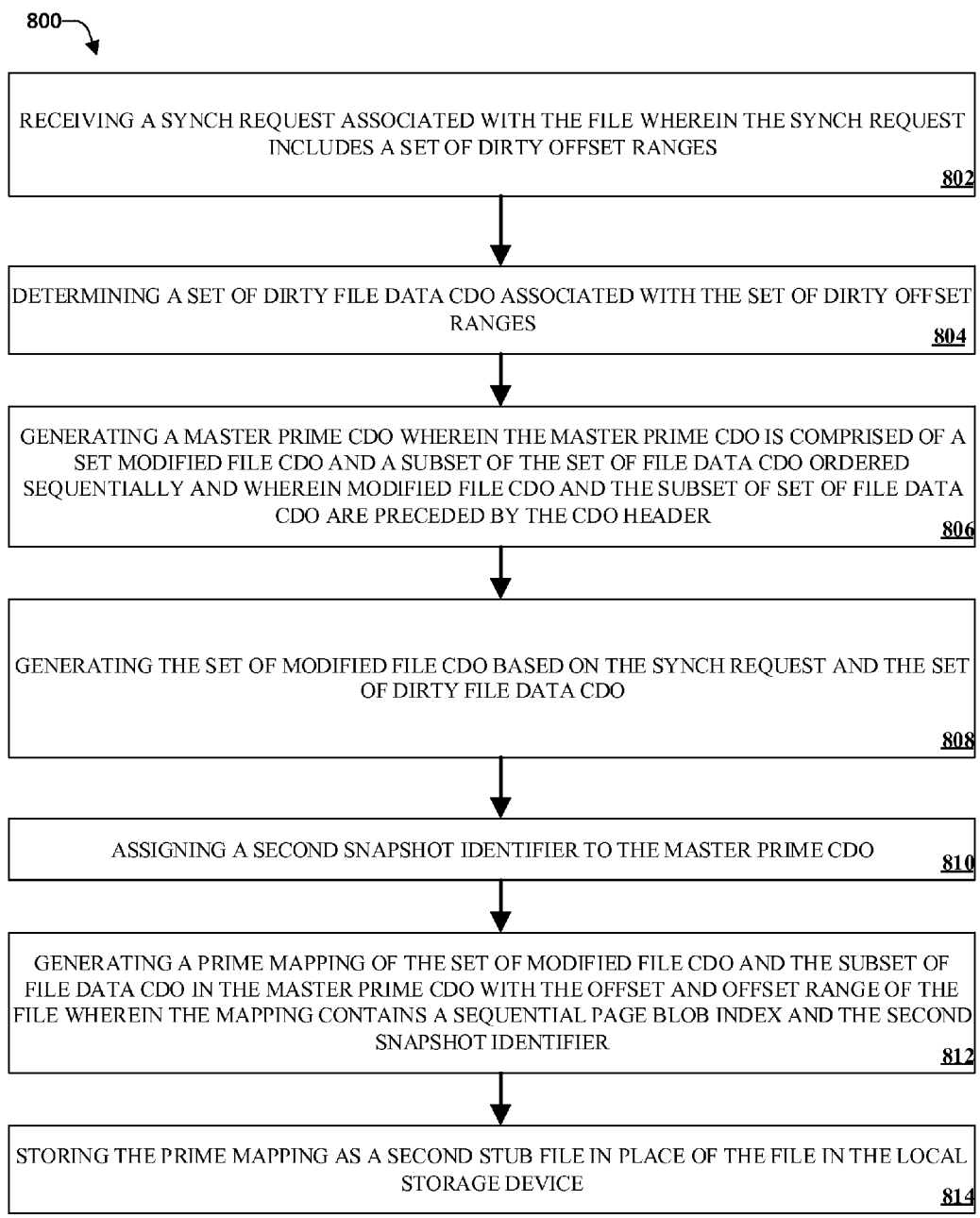
FIG. 8 illustrates an example flow diagram method for writing back data to a cloud service provider using page blobs in accordance with implementations of this disclosure.

FIG. 8 illustrates an example flow diagram method for writing back data to a cloud service provider using page blobs in accordance with implementations of this disclosure. It can be appreciated that, in one implementation, the steps depicted in FIG. 8 can occur after the steps of FIG. 7 have occurred, e.g., after data has been tiered to a cloud storage provider that supports page blobs. At 802, a synch request associated with a file can be received wherein the synch request includes a set of dirty offset ranges.

At 804, a set of dirty file data CDO associated with the set of dirty offset ranges can be determined. At 806, a master prime CDO can be generated wherein the master prime CDO is comprised of a set modified file CDO and a subset of the set of file data CDO ordered sequentially and wherein modified file CDO and the subset of set of file data CDO are preceded by the CDO header. At 808, the set of modified file CDO can be generated based on the synch request and the set of dirty file data CDO. For example, the subset of the set of file data CDO are the CDO from the original file that are not modified by the write and the set of modified file CDO are the CDO that have been modified. It can be appreciated in that in some implementations, all CDO may be modified and the subset of the set of file data CDO may not be included in the master prime CDO. At 808, a second snapshot identifier can be assigned to the master prime CDO. At 810, a prime mapping of the set of modified file CDO and the subset of file CDO in the master CDO with the offset and offset rang of the file can be generated wherein the mapping contains a sequential page blob index and the second snapshot identifier. At 812, the prime mapping can be stored as a second stub file in place of the file in the local storage device. In one implementation, storing the second stub file can further include retaining the master CDO as a snapshot of the file. It can be appreciated that the master CDO retained can be used to restore a previous version of the file, e.g., the file prior to portions of the file being overwritten during the synch process.

Figure 9:
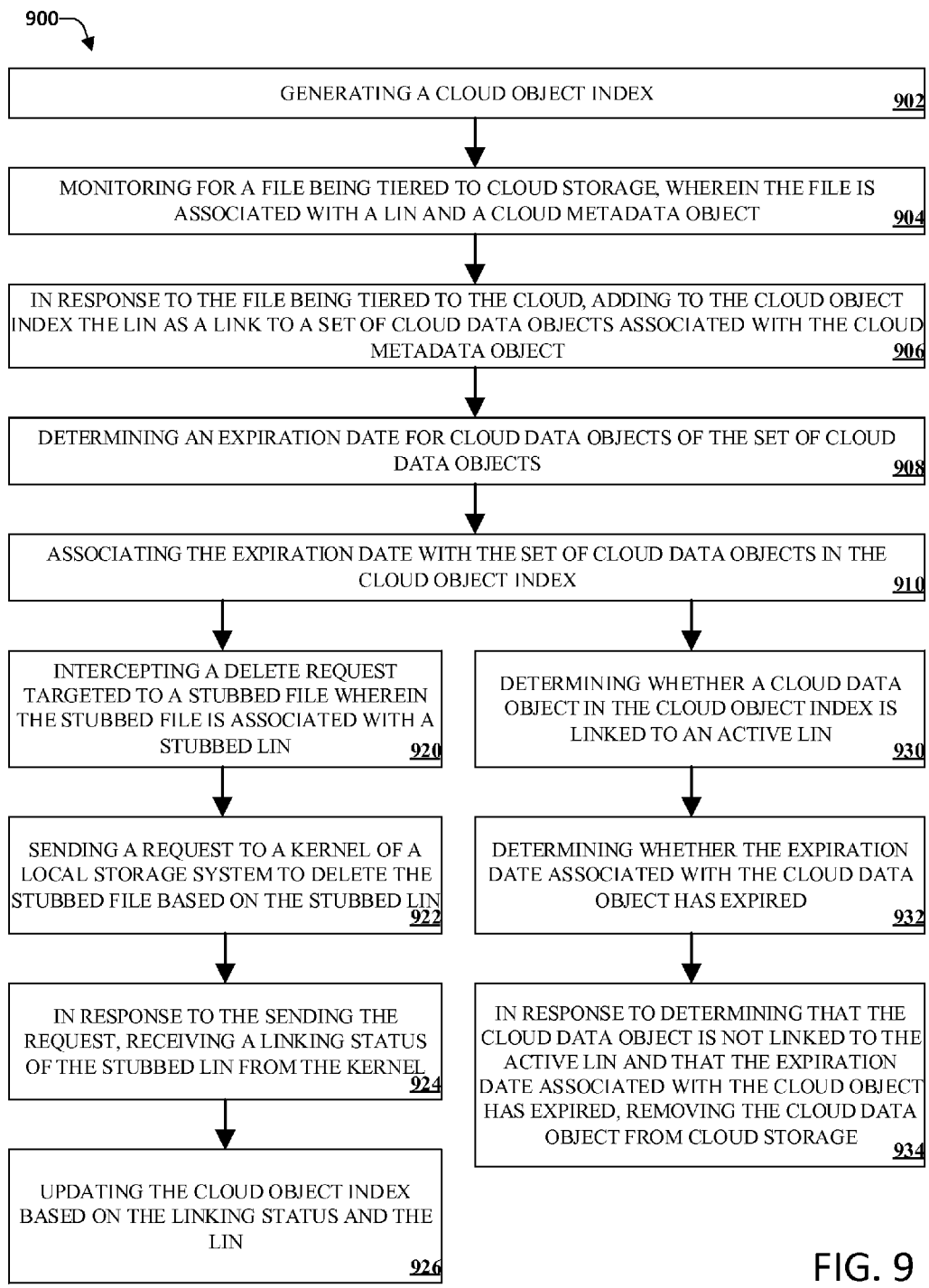
FIG. 9 illustrates an example flow diagram method for garbage collection in accordance with implementations of this disclosure.

FIG. 9 illustrates an example flow diagram method for garbage collection in accordance with implementations of this disclosure. At 902, a cloud object index can be generated. At 904, it can be monitored for when a file is being tiered to cloud storage, wherein the file is associated with a LIN and a Cloud Metadata Object. At 906, in response to the file being tiered to the cloud, the LIN can be added to the cloud object index as a link to a set of cloud data objects associated with the cloud metadata object. At 908, an expiration date for cloud data objects in the set of cloud data objects can be determined. In one implementation, determining the expiration date is based on a retention period associated with the LIN and wherein the retention period is based on at least one of a snapshot status, a user defined retention period associated with the LIN, and a regulatory defined retention period associated with the LIN. For example, health records, financial records, or other regulatory data may have a statutory prescribed retention period for data. At 910, the expiration date can be associated with the set of cloud data object in the cloud object index. It can be appreciated that garbage collection can also support an active scanning process to identify orphan CDO's that are not referenced by any active CMO's.

The flow diagram method can now proceed with Step 920 to process delete requests associated with a stubbed file or with Step 930 to determine whether the cloud data object can be removed from cloud storage.

At 920, a delete request targeted to a stubbed file can be intercepted wherein the stubbed file is associated with a stubbed LIN. At 932, a request can be sent to a kernel operation of a local storage system to delete the stubbed file based on the stubbed LIN. At 924, in response to the sending the request at step 932, a linking status of the stubbed LIN can be received from the kernel. In one implementation, the linking status includes active snapshot links associated with the LIN. At 926, the cloud object index can be updated based on the linking status and the LIN. In one implementation, updating the cloud object index includes removing the stubbed LIN as a link to the set of cloud data objects associated with the stubbed LIN.

At 930, it can be determined whether a cloud data object in the cloud object index is linked to in an active LIN. At 932, it can be determined whether the expiration data associated with the cloud data object has expired. At 934, in response to determining that the cloud data object is not linked to the active LIN and that the expiration date associated with the cloud object has expired, the cloud data object can be removed from cloud storage. It can be appreciated that removing the cloud data object from cloud storage can involve sending a request using the cloud adapter component 180 to the account associated with the cloud object using the proper API for the cloud storage provider.

Figure 10:
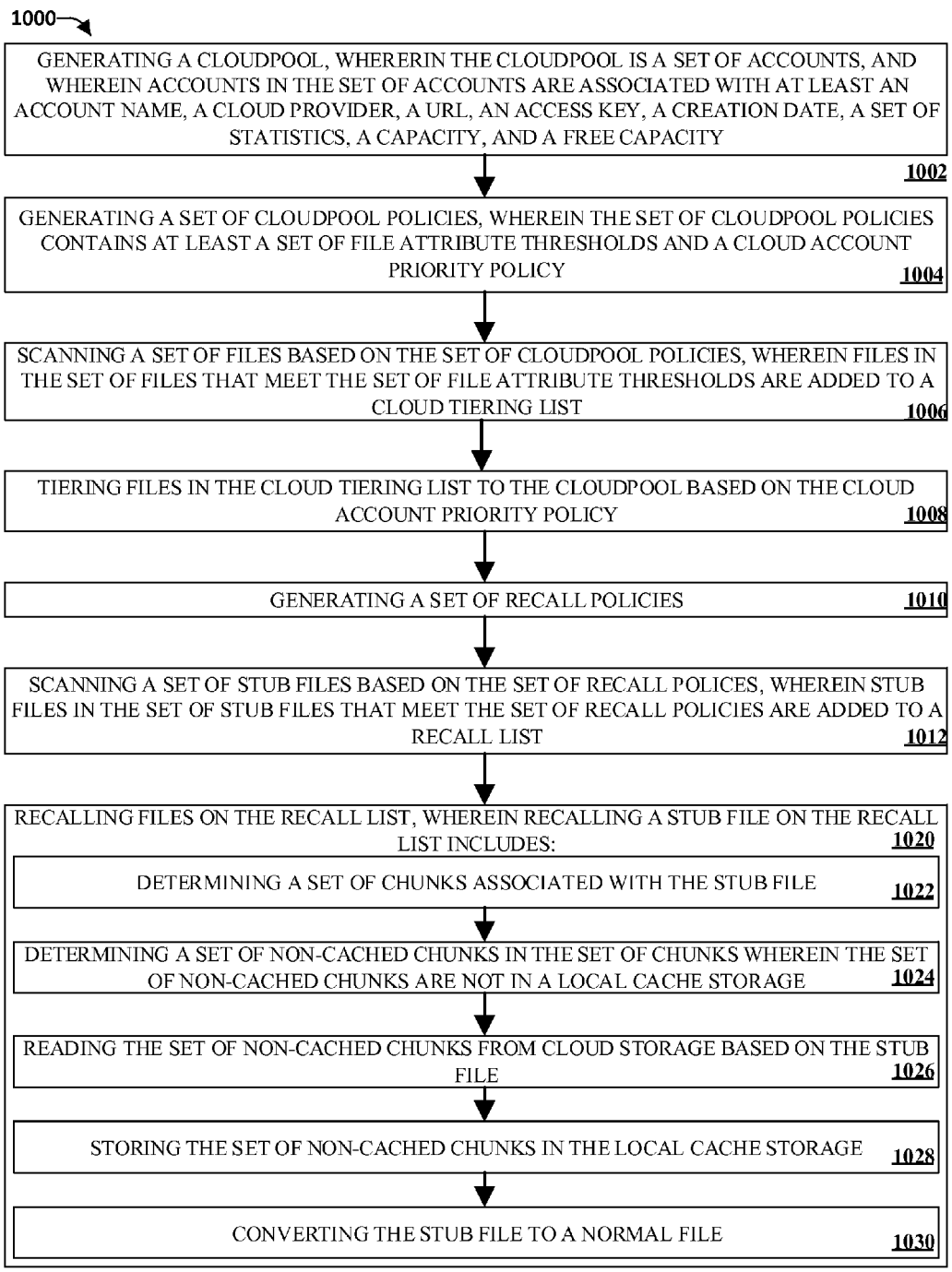
FIG. 10 illustrates an example flow diagram method for generating a cloudpool and a set of policies and their use in cloud storage in accordance with implementations of this disclosure.

FIG. 10 illustrates an example flow diagram method for generating a cloudpool and a set of policies and their use in cloud storage in accordance with implementations of this disclosure. At 1002, a cloudpool can be generated, wherein the cloudpool is a set of accounts, and wherein accounts in the set of accounts are associated with at least an account name, a cloud provider, a URL, an access key, a creation date, a set of statistics, a capacity, and a free capacity. At 1004, a set of cloudpool policies can be generated, wherein the set of cloudpool policies contains at least a set of file attribute thresholds and a cloud account priority policy. In one implementation, the set of file attribute thresholds include thresholds associated with file name, file path, file size, file attributes including user generated file attributes, last modified time, last access time, last status change, and file ownership. At 1006, a set of files can be scanned based on the set of cloudpool policies, wherein files in the set of files that meet the set of file attribute thresholds are added to a cloud tiering list. At 1008, files in the cloud tiering list can be tiered to the cloudpool based on the cloud account priority policy.

At 1010 a set of recall policies can be generated. At 1012, a set of stub files can be scanned based on the set of recall policies, wherein stub files in the set of stub files that meet the set of recall policies are added to a recall list. In one implementation, the set of recall policies include a locally cached data percentage threshold, total access amount threshold, and a time period threshold. For example, a locally cached data percentage threshold can relate to the total percentage of the file that is locally cached. The total access amount threshold can relate to the total number of times a file and/or chunks of the file have been accessed over a certain period of time. The time period threshold can relate to the total amount of time the file and/or chunks of the file have remained on cloud storage.

At 1020, files on the recall list can be recalled. Recalling a stub file on the recall list can include steps 1022-1030. At step 1022, a set of chunks associated with the stub file can be determined. At 1024, a set of non-cached chunks in the set of chunks can be determined wherein the set of non-cached chunks are not in a local cache storage. At 1026, the set of non-cached chunks can be read from cloud storage based on the stub file. At 1028, the set of non-cached chunks can be stored in the local cache storage. At 1030, the stub file can be converted into a normal file. It can be appreciated that a normal file is a non-stubbed file where the local file cluster hosts the file data.

Figure 11:
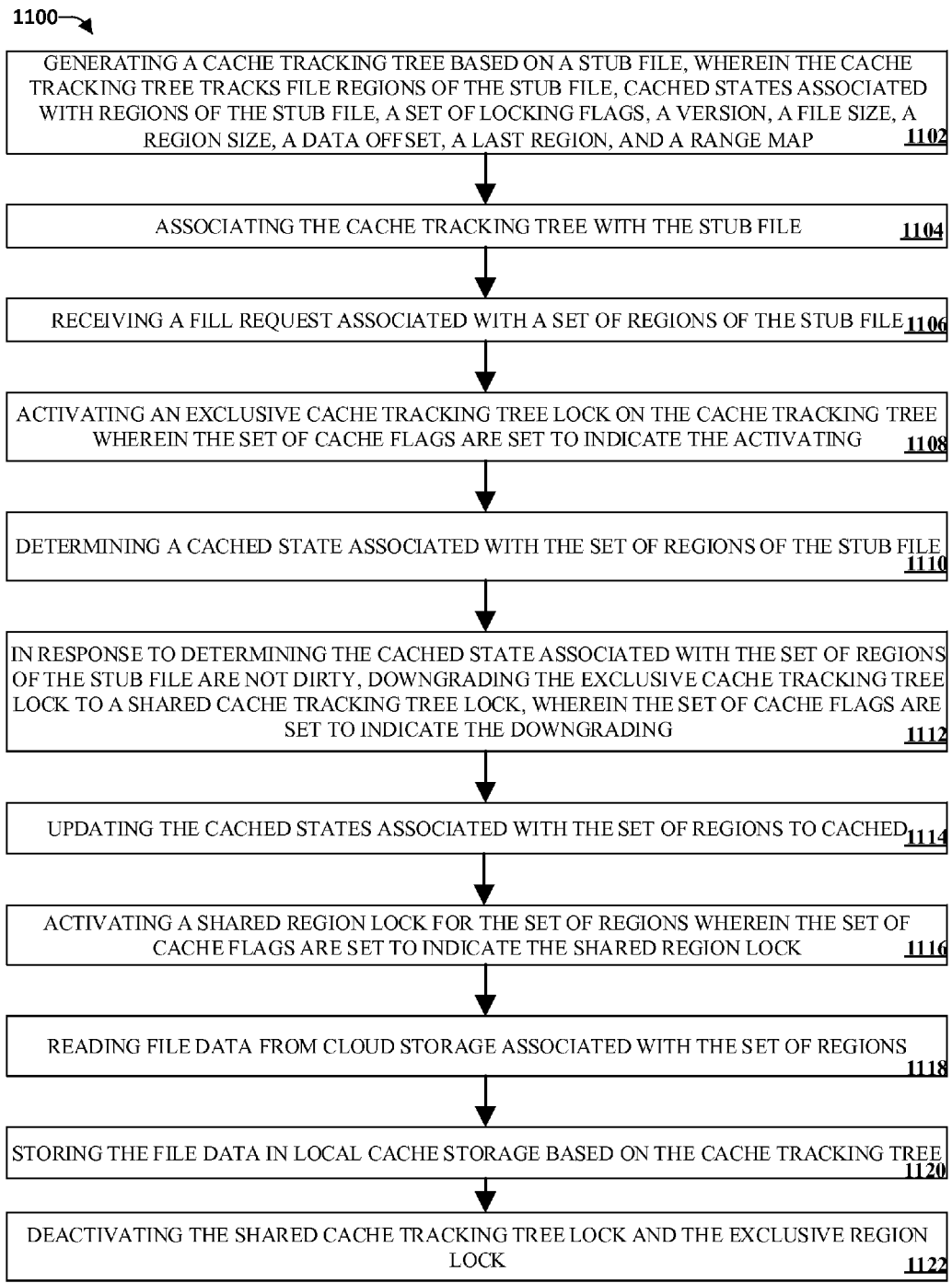
FIG. 11 illustrates and example flow diagram method for using a cache tracking tree in association with processing a fill request for a file tiered to cloud storage in accordance with implementations of this disclosure.
Figure 12:
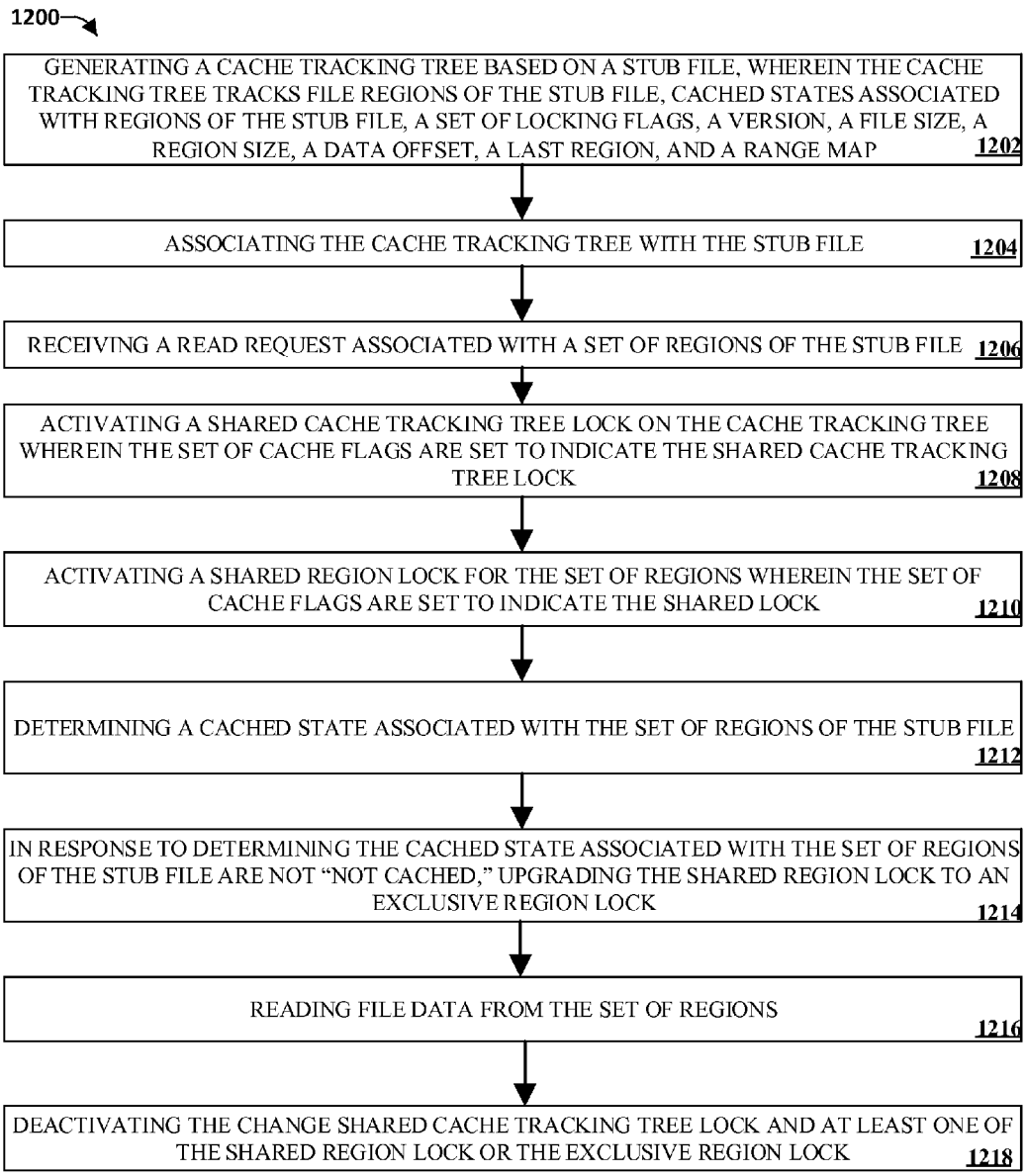
FIG. 12 illustrates and example flow diagram method for using a cache tracking tree in association with processing a read request for a file tiered to cloud storage in accordance with implementations of this disclosure.
Figure 13:
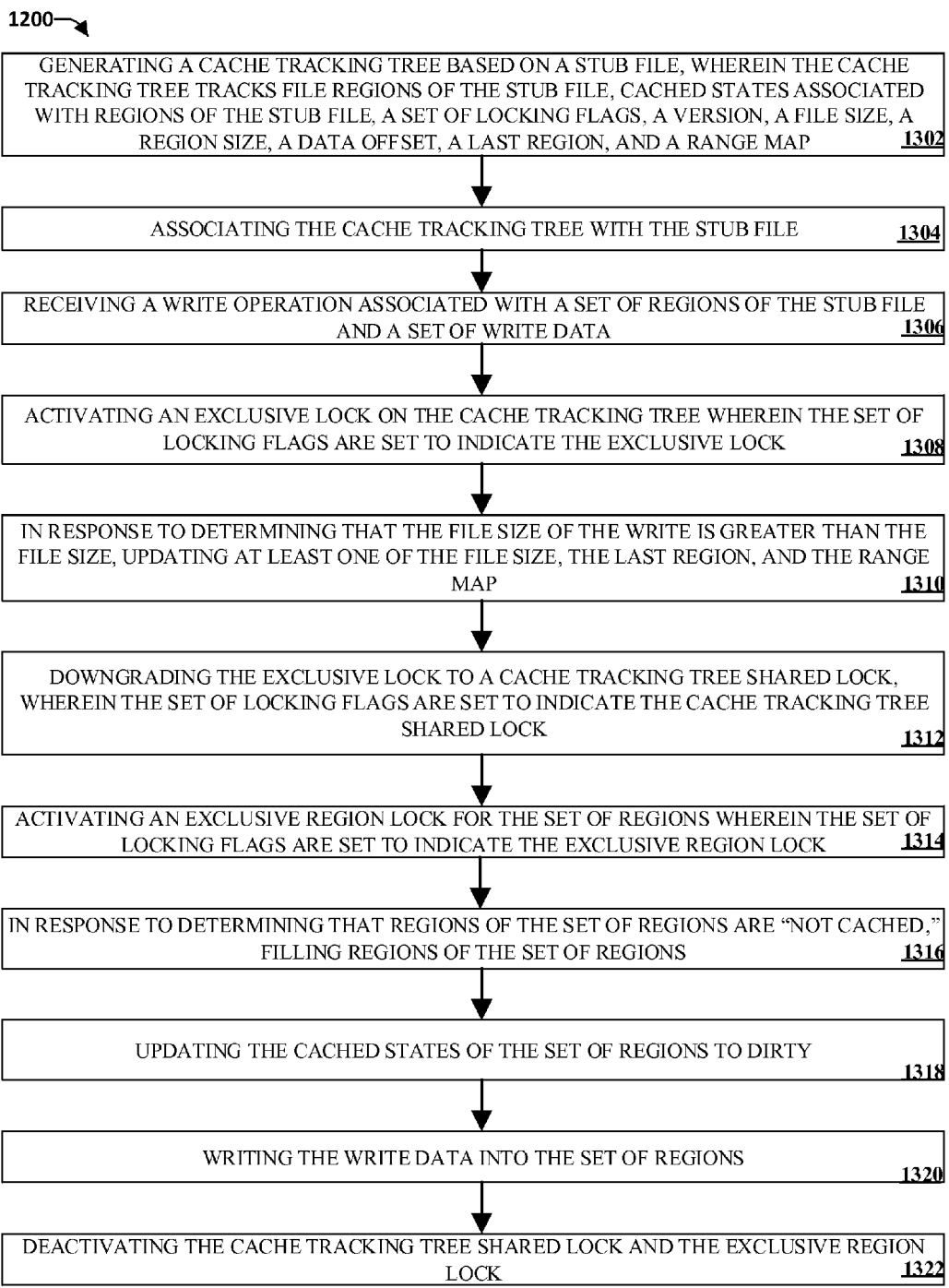
FIG. 13 illustrates and example flow diagram method for using a cache tracking tree in association with processing a write request for a file tiered to cloud storage in accordance with implementations of this disclosure.

FIGS. 11-13 illustrate example flow diagram methods for using a cache tracking tree in association with implementations of this disclosure. It can be appreciated that through the use of the cache tracking tree, unfinished transactions can be resumed as the state of the transaction can be known or inferred based on the cache tracking tree. It can also be appreciated that by using the cache tracking tree, synch operations (e.g., operations where data is being synched between local storage and cloud storage) can proceed concurrently. For example, a cache state of "synch-in-progress" enables the writeback (e.g., the synch) to occur concurrently with the write being written to the cache.

FIG. 11 illustrates and example flow diagram method for using a cache tracking tree in association with processing a fill request for a file tiered to cloud storage in accordance with implementations of this disclosure. At 1102, a cache tracking tree can be generated based on a stub file, wherein the cache tracking tree tracks file regions of the stub file, cached states associated with regions of the stub file, a set of cache flags, a version, a file size, a region size, a data offset, a last region, and a range map. At 1104, the cache tracking tree can be associated with the stub file.

At 1106, a fill request associated with a set of regions of the stub file can be received. At 1108, an exclusive cache tracking tree lock can be activated on the cache tracking tree wherein the set of cache flags are set to indicate the activating. In some implementations, a shared lock on the cache tracking tree can be used. It can be appreciated that an exclusive lock can create more performance penalties on a file system than a shared lock, and thus a shared lock is favored, but an exclusive lock is necessary to increase concurrency. Thus in one implementation, the lock is first made shared and only upgraded to exclusive when a concurrency threshold is met.

At 1110, a cached state associated with the set of regions of the stub file can be determined. At 1112, in response to determining the cached state associated with the set of regions of the stub file are not dirty, downgrading the exclusive cache tracking tree lock to a shared cache tracking tree lock, wherein the set of cache flags are set to indicate the downgrading. At 1114, the cached states associated with the set of regions can be updated to cached.

At 1116, a shared region lock can be activated for the set of regions wherein the set of cache flags are set to indicate the shared region lock. In one implementation, the exclusive region lock is only applied when waiting for data. For example, when the cached state of a region has been updated to "cached", an exclusive lock can be activated until the data is actually filled in the steps below.

At 1118, file data can be read from cloud storage associated with the set of regions. At 1120, the file data can be stored in local cache storage based on the cache tracking tree. At 1122, the shared cache tracking tree lock and the exclusive region lock can be deactivated.

FIG. 12 illustrates and example flow diagram method for using a cache tracking tree in association with processing a read request for a file tiered to cloud storage in accordance with implementations of this disclosure. At 1202, a cache tracking tree can be generated based on a stub file, wherein the cache tracking tree tracks file regions of the stub file, cached states associated with regions of the stub file, a set of cache flags, a version, a file size, a region size, a data offset, a last region, and a range map. At 1204, the cache tracking tree can be associated with the stub file.

At 1206, a read request associated with a set of regions of the stub can be received. At 1208, a shared cache tracking tree lock can be activated on the cache tracking tree, wherein the set of cache flags are set to indicate the cache tracking tree shared lock. At 1210, a shared region lock for the set of regions can be activated wherein the set of cache flags are set to indicate the shared lock. At 1212, the cache state associated with the set of regions of the stub file can be determined. At 1214, in response to determining the cached state associated with the set of regions of the stub file are not "not cached", the shared region lock can be upgraded to an exclusive region lock. At 1216, file data can be read from the set of regions. At 1216, the change shared cache tracking tree lock and at least one of the shared region lock or the exclusive region lock can be deactivated.

FIG. 13 illustrates and example flow diagram method for using a cache tracking tree in association with processing a write request for a file tiered to cloud storage in accordance with implementations of this disclosure. At 1302, a cache tracking tree can be generated based on a stub file, wherein the cache tracking tree tracks file regions of the stub file, cached states associated with regions of the stub file, a set of cache flags, a version, a file size, a region size, a data offset, a last region, and a range map. At 1304, the cache tracking tree can be associated with the stub file.

At 1306, a write operation associated with a set of regions of the stub file and a set of write data can be received. At 1308, an exclusive lock can be activated on the cache tracking tree wherein the set of cache flags are set to indicate the exclusive lock. At 1310, in response to determining that the file size of the write is greater than the file size, at least one of the file size, the last regions and the range can be updated. At 1312, the exclusive lock can be downgraded to a cache tracking tree shared lock, wherein the set of cache flags are set to indicate the cache tracking tree shared lock. At 1314, an exclusive region lock for the set of regions can be activated, wherein the set of cache flags are set to indicate the exclusive region lock. At 1316, in response to determining that regions of the set of regions are "not cached", regions of the set of regions can be filled. At 1318, the cached states of the set of regions can be updated to dirty. At 1320, the write data can be written into the set of regions. At 1322, the cache tree share lock and the exclusive region lock can be deactivated.

Figure 14:
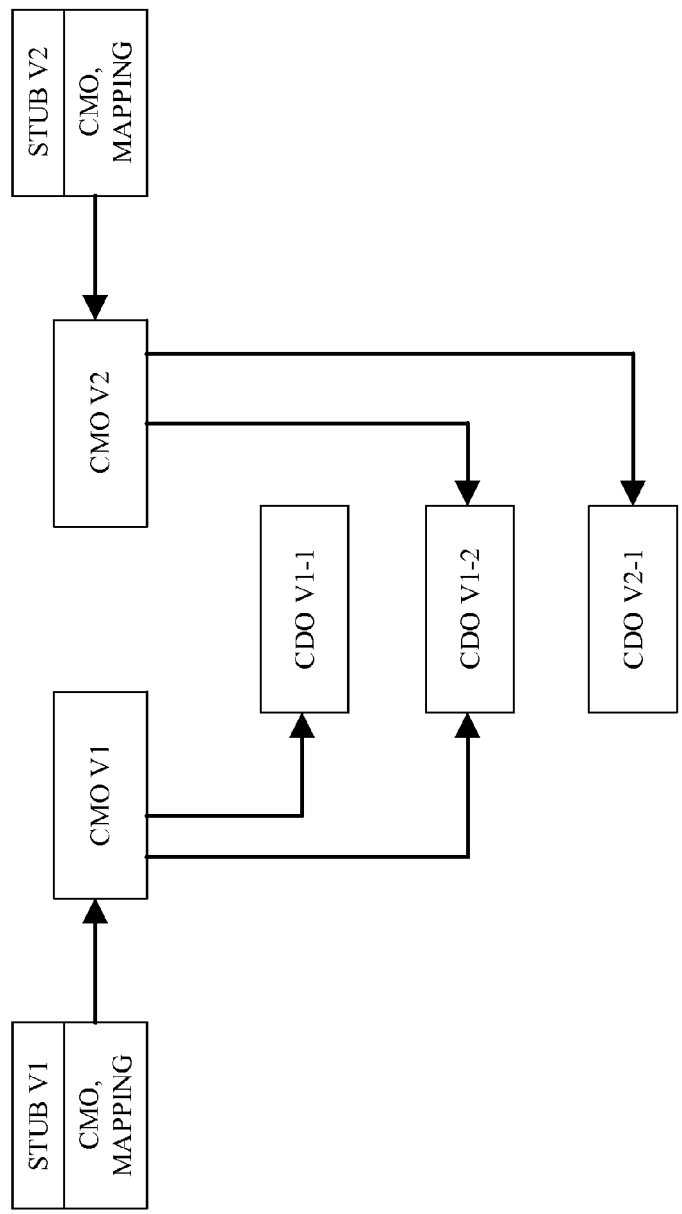
FIG. 14 illustrates an example mapping of cloud data objects for an old version and a new version of a stub file in accordance with implementations of this disclosure.

FIG. 14 illustrates an example mapping of cloud data objects for an old version and a new version of a stub file in accordance with implementations of this disclosure. The Figure depicts a stub file that has two versions Stub V1 and Stub V2. The Stubs can store information related to the mapping of the CDO's associated with the stub as well as reference to the CMO associated with the stub. Stub V1 points to CMO V1, whereas Stub V2 points to CMO V2. In this example, Stub V1 and Stub V2 both share CDO V1-2 as the second CDO associated with each stub; however, Stub V1 points to CDO V1-1 as its first CDO and Stub V2 points to CDO V2-1 as its first CDO. Thus, it can be appreciated that Stub V2 is likely an updated version of the file represented by Stub V1, where the first chunk associated with the file was updated with new data, e.g., CDO V1-2. It can be further appreciated that by not modifying the CDO V1-2 associated with Stub V1 (e.g., overwriting the previous CDO), the data needed to reconstitute the file that Stub V1 is referencing still exists in cloud storage even after the data associated with Stub V2 is written to cloud storage. It can be further appreciated that by maintaining a single copy of the shared data object CDO V1-2, space can be conserved on cloud storage as two instances of the same chunk need not be stored separately, rather the separate stubs can point to the same CDO, CDO V1-2. As described above with respect garbage collection, CDO's can be examined for remaining active links by stubs or snapshots to individual CDO's, thus CDO's will in general, be retained, until no active stubs and/or snapshots are pointing the CDO. However, data retention policies as discussed above may still provide for retaining a CDO even if no active linking to the CDO is maintained.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   generating a cache tracking tree based on a stub file, wherein the cache tracking tree tracks file regions of the stub file, cached states associated with regions of the stub file, a set of cache flags, a version, a file size, a region size, a data offset, a last region, and a range map;
   associating the cache tracking tree with the stub file;
   receiving a read request associated with a set of regions of the stub file;
   activating a shared cache tracking tree lock on the cache tracking tree wherein the set of cache flags are set to indicate the shared cache tracking tree lock;
   activating a shared region lock for the set of regions, wherein the set of cache flags are set to indicate the shared region lock;
   determining a cached state associated with the set of regions of the stub file;
   in response to determining the cached state associated with the set of regions of the stub file do not have a state of not cached, upgrading the shared region lock to an exclusive region lock;
   reading file data from the set of regions; and
   deactivating the shared cache tracking tree lock and the exclusive region lock.

2. The method of claim 1, further comprising:
   receiving a fill request associated with a set of regions of the stub file;
   activating an exclusive cache tracking tree lock on the cache tracking tree, wherein the set of cache flags are set to indicate the exclusive cache tracking tree lock is active;
   determining a cached state associated with the set of regions of the stub file;
   in response to determining the cached state associated with the set of regions of the stub file are not dirty, downgrading the exclusive cache tracking tree lock to a shared cache tracking tree lock, wherein the set of cache flags are set to indicate the shared cache tracking tree lock is active;
   updating the cached states associated with the set of regions to cached;
   activating a shared region lock for the set of regions wherein the set of cache flags are set to indicate the shared region lock;
   reading file data from cloud storage associated with the set of regions;
   storing the file data in local cache storage based on the cache tracking tree; and
   deactivating the shared cache tracking tree lock and the shared region lock.

3. The method of claim 1, further comprising:
   receiving a write operation associated with a set of regions of the stub file and a set of write data;
   activating an exclusive lock on the cache tracking tree wherein the set of cache flags are set to indicate the exclusive lock;
   in response to determining that the file size of the write is greater than the file size, updating at least one of the file size, the last region, and the range map;
   downgrading the exclusive lock to a cache tracking tree shared lock, wherein the set of cache flags are set to indicate the cache tracking tree shared lock;
   activating an exclusive region lock for the set of regions wherein the set of cache flags are set to indicate the exclusive region lock;
   in response to determining that regions of the set of regions have a cached state of not cached, filling regions of the set of regions;
   updating the cached states of the set of regions to dirty;
   writing the write data into the set of regions; and
   deactivating the cache tracking tree shared lock and the exclusive region lock.

4. A system comprising at least one storage device and at least one hardware processor configured to:
   generating a cache tracking tree based on a stub file, wherein the cache tracking tree tracks file regions of the stub file, cached states associated with regions of the stub file, a set of cache flags, a version, a file size, a region size, a data offset, a last region, and a range map;
   associating the cache tracking tree with the stub file;
   receiving a read request associated with a set of regions of the stub file;
   activating a shared cache tracking tree lock on the cache tracking tree wherein the set of cache flags are set to indicate the shared cache tracking tree lock;
   activating a shared region lock for the set of regions, wherein the set of cache flags are set to indicate the shared region lock;
   determining a cached state associated with the set of regions of the stub file;
   in response to determining the cached state associated with the set of regions of the stub file do not have a state of not cached, upgrading the shared region lock to an exclusive region lock;

reading file data from the set of regions; and
deactivating the shared cache tracking tree lock and the exclusive region lock.

5. The system of claim 4, further configured to:
receiving a fill request associated with a set of regions of the stub file;
activating an exclusive cache tracking tree lock on the cache tracking tree, wherein the set of cache flags are set to indicate the exclusive cache tracking tree lock is active;
determining a cached state associated with the set of regions of the stub file;
in response to determining the cached state associated with the set of regions of the stub file are not dirty, downgrading the exclusive cache tracking tree lock to a shared cache tracking tree lock, wherein the set of cache flags are set to indicate the shared cache tracking tree lock is active;
updating the cached states associated with the set of regions to cached;
activating a shared region lock for the set of regions wherein the set of cache flags are set to indicate the shared region lock;
reading file data from cloud storage associated with the set of regions;
storing the file data in local cache storage based on the cache tracking tree; and
deactivating the shared cache tracking tree lock and the shared region lock.

6. The system of claim 4, further configured to:
receiving a write operation associated with a set of regions of the stub file and a set of write data;
activating an exclusive lock on the cache tracking tree wherein the set of cache flags are set to indicate the exclusive lock;
in response to determining that the file size of the write is greater than the file size, updating at least one of the file size, the last region, and the range map;
downgrading the exclusive lock to a cache tracking tree shared lock, wherein the set of cache flags are set to indicate the cache tracking tree shared lock;
activating an exclusive region lock for the set of regions wherein the set of cache flags are set to indicate the exclusive region lock;
in response to determining that regions of the set of regions have a cached state of not cached, filling regions of the set of regions;
updating the cached states of the set of regions to dirty;
writing the write data into the set of regions; and
deactivating the cache tracking tree shared lock and the exclusive region lock.

7. A non-transitory computer readable medium with program instructions stored thereon to perform the following acts:
generating a cache tracking tree based on a stub file, wherein the cache tracking tree tracks file regions of the stub file, cached states associated with regions of the stub file, a set of cache flags, a version, a file size, a region size, a data offset, a last region, and a range map;
associating the cache tracking tree with the stub file;
receiving a read request associated with a set of regions of the stub file;
activating a shared cache tracking tree lock on the cache tracking tree wherein the set of cache flags are set to indicate the shared cache tracking tree lock;
activating a shared region lock for the set of regions, wherein the set of cache flags are set to indicate the shared region lock;
determining a cached state associated with the set of regions of the stub file;
in response to determining the cached state associated with the set of regions of the stub file do not have a state of not cached, upgrading the shared region lock to an exclusive region lock;
reading file data from the set of regions; and
deactivating the shared cache tracking tree lock and the exclusive region lock.

8. The non-transitory computer readable medium of claim 7, with program instructions stored thereon to further perform the following acts:
receiving a fill request associated with a set of regions of the stub file;
activating an exclusive cache tracking tree lock on the cache tracking tree, wherein the set of cache flags are set to indicate the exclusive cache tracking tree lock is active;
determining a cached state associated with the set of regions of the stub file;
in response to determining the cached state associated with the set of regions of the stub file are not dirty, downgrading the exclusive cache tracking tree lock to a shared cache tracking tree lock, wherein the set of cache flags are set to indicate the shared cache tracking tree lock is active;
updating the cached states associated with the set of regions to cached;
activating a shared region lock for the set of regions wherein the set of cache flags are set to indicate the shared region lock;
reading file data from cloud storage associated with the set of regions;
storing the file data in local cache storage based on the cache tracking tree; and
deactivating the shared cache tracking tree lock and the shared region lock.

9. The non-transitory computer readable medium of claim 7, with program instructions stored thereon to further perform the following acts:
receiving a write operation associated with a set of regions of the stub file and a set of write data;
activating an exclusive lock on the cache tracking tree wherein the set of cache flags are set to indicate the exclusive lock;
in response to determining that the file size of the write is greater than the file size, updating at least one of the file size, the last region, and the range map;
downgrading the exclusive lock to a cache tracking tree shared lock, wherein the set of cache flags are set to indicate the cache tracking tree shared lock;
activating an exclusive region lock for the set of regions wherein the set of cache flags are set to indicate the exclusive region lock;
in response to determining that regions of the set of regions have a cached state of not cached, filling regions of the set of regions;
updating the cached states of the set of regions to dirty;
writing the write data into the set of regions; and
deactivating the cache tracking tree shared lock and the exclusive region lock.

* * * * *